Oct. 24, 1939.  E. A. CORBIN, JR  2,177,349
VALVE CONSTRUCTION
Filed Dec. 30, 1937   3 Sheets-Sheet 1
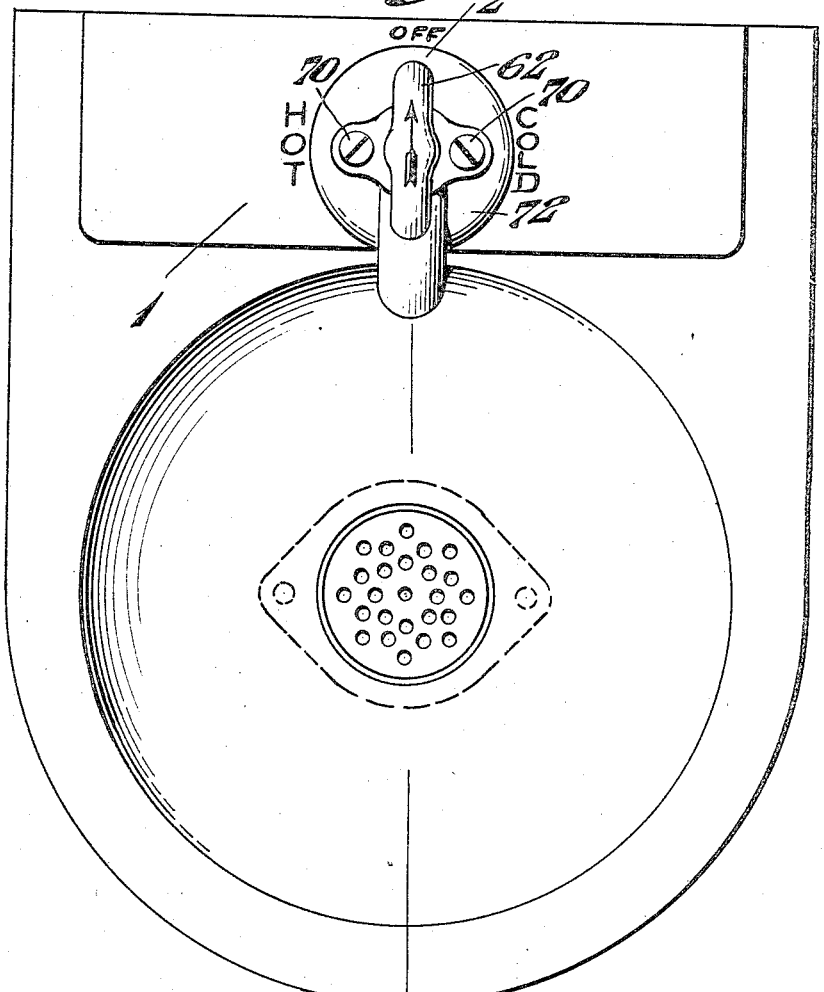
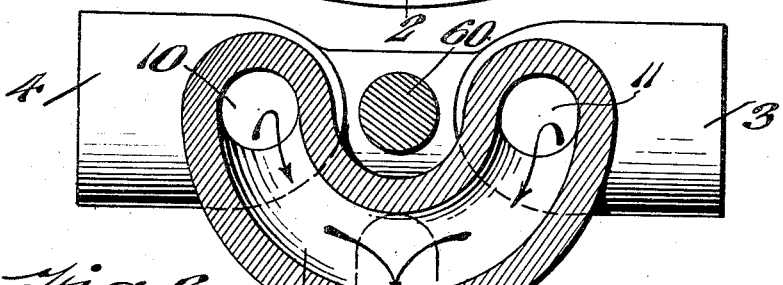
INVENTOR
Elbert A. Corbin, Jr.
BY
Louis Necho
ATTORNEY Oct. 24, 1939.   E. A. CORBIN, JR   2,177,349
VALVE CONSTRUCTION
Filed Dec. 30, 1937   3 Sheets-Sheet 2

INVENTOR
Elbert A. Corbin, Jr.
BY
ATTORNEY

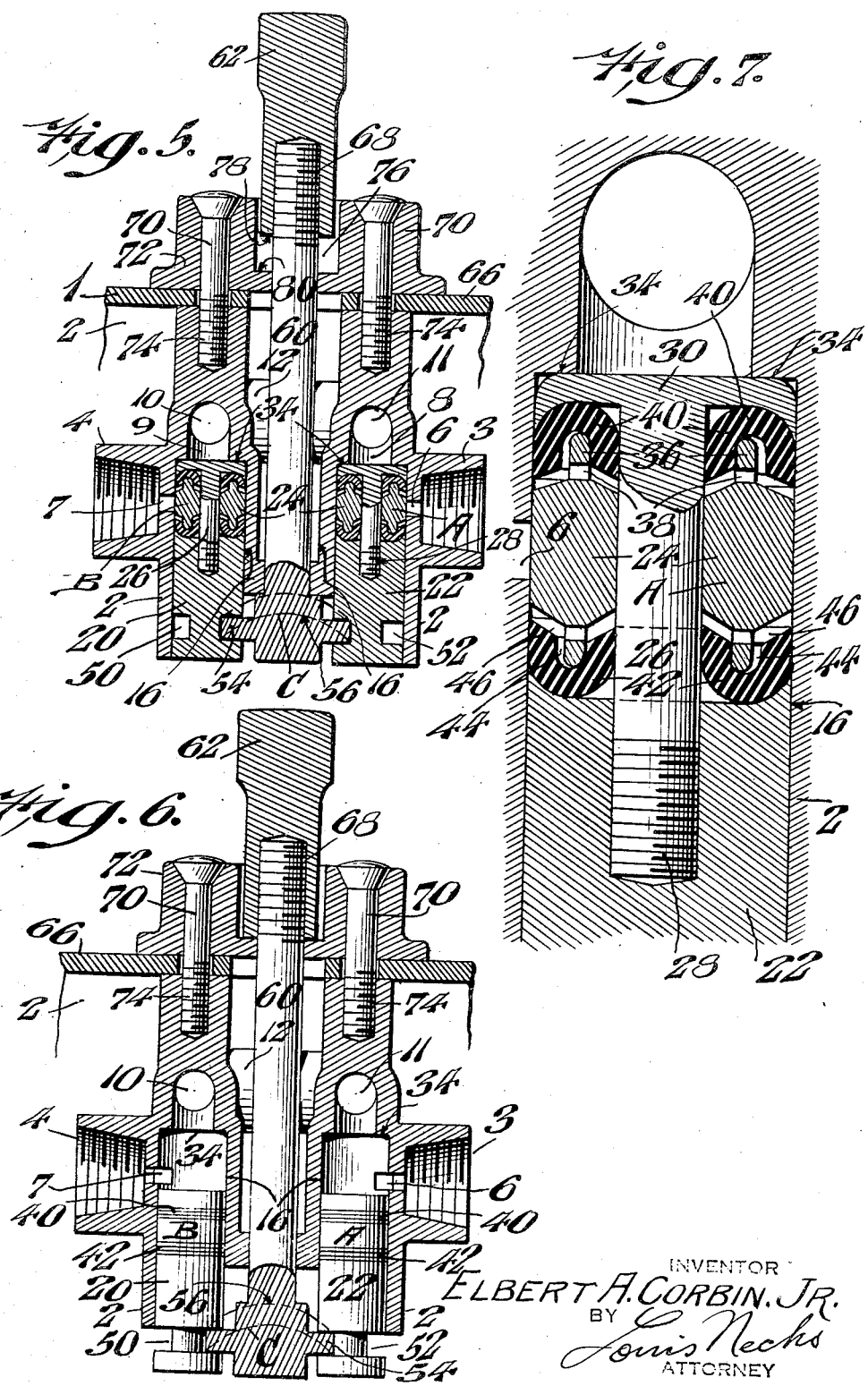

Patented Oct. 24, 1939

2,177,349

UNITED STATES PATENT OFFICE 2,177,349

VALVE CONSTRUCTION

Elbert A. Corbin, Jr., Lansdowne, Pa., assignor to William C. Biddle, Lansdowne, Pa.

Application December 30, 1937, Serial No. 182,540

1 Claim. (Cl. 277—18)

My invention relates to a new and useful valve construction and it relates more particularly to a valve construction whereby, with the use of but a single manipulating valve stem, hot or cold water may be separately dispensed in full or partial volume or completely shut off, one to the exclusion of the other, or whereby any desired mixture of hot and cold water may be dispensed in full or partial volume or completely shut off.

As far as I am aware, it has heretofore, and is now, the universal practice to use a separate valve for controlling the flow of cold water, and another valve for controlling hot water, said valves leading either to separate spigots or to a single spigot with or without the provision of a mixing chamber in association with said single spigot. The disadvantages of such plumbing are acute and obvious. Thus, it is impossible, according to present practice, to attain the desired mixture of hot and cold water and then shut it off when not immediately needed and open the spigot and receive the same previously set mixture without the provision of an excessive amount of hardware. In other words, if a person is taking a shower and the hot and cold water have been mixed to the desired extent, and it is necessary to shut the shower off temporarily, such as for the purpose of applying soap, it is impossible to do so without shutting off the cold and hot water valves which means that, when it is again desired to turn the shower on, the person using it must manipulate to attain the mixture he wishes again, all of which, not only takes time and is uncomfortable, but is also definitely injurious, since in manipulating the shower it is possible to get the mixture alternately too hot or too cold before the correct mixture is attained. To overcome this difficulty modern plumbing has been provided with another valve in addition to the hot and cold valves so that the water, after the proper mixture has been attained, may be turned up to the shower or down through a spigot located near the floor of the shower stall. In this construction, while it is possible to turn the shower off without altering the mixture, the fact remains that the water is going to waste through the lower spigot, and the fact further remains that three valves are used. This problem is even more acute in washing dishes, which is done at least three times a day in the average home, and in which it is desired, first to submit the dish to the action of water of sufficient temperature in order to loosen the grease film, and then to apply soap to the dish. According to the present constructions, due to the fact that it would be infinitely troublesome to shut off the water between the washing of each dish, the water is allowed to run continuously thus producing excessive waste.

It is therefore the object of my invention, and I have produced a construction that attains that object, to provide a single handle by means of which unadulterated cold or hot water may be delivered and by means of which the proper mixture once attained can be maintained and the water flow regulated or completely shut off without in any way altering the nature of the mixture.

My invention further involves a very delicate structure by means of which only a relatively short range of movement will result in varying the mixture or the volume, or completely opening or completely shutting the flow of the water.

In the accompanying drawings:

Fig. 1 represents a plan view of a valve construction embodying my invention shown applied to a wash basin or the like.

Fig. 3 represents, on an enlarged scale, a fragmentary sectional view on line 3—3 of Fig. 4.

Fig. 5 is a view similar to Fig. 4 showing both inlets completely shut off.

Fig. 6 is a view similar to Fig. 5 showing both inlets completely open.

Fig. 7 represents, on a greatly enlarged scale, the detailed structure of the valve plugs for shutting the inlets.

Figure 2:
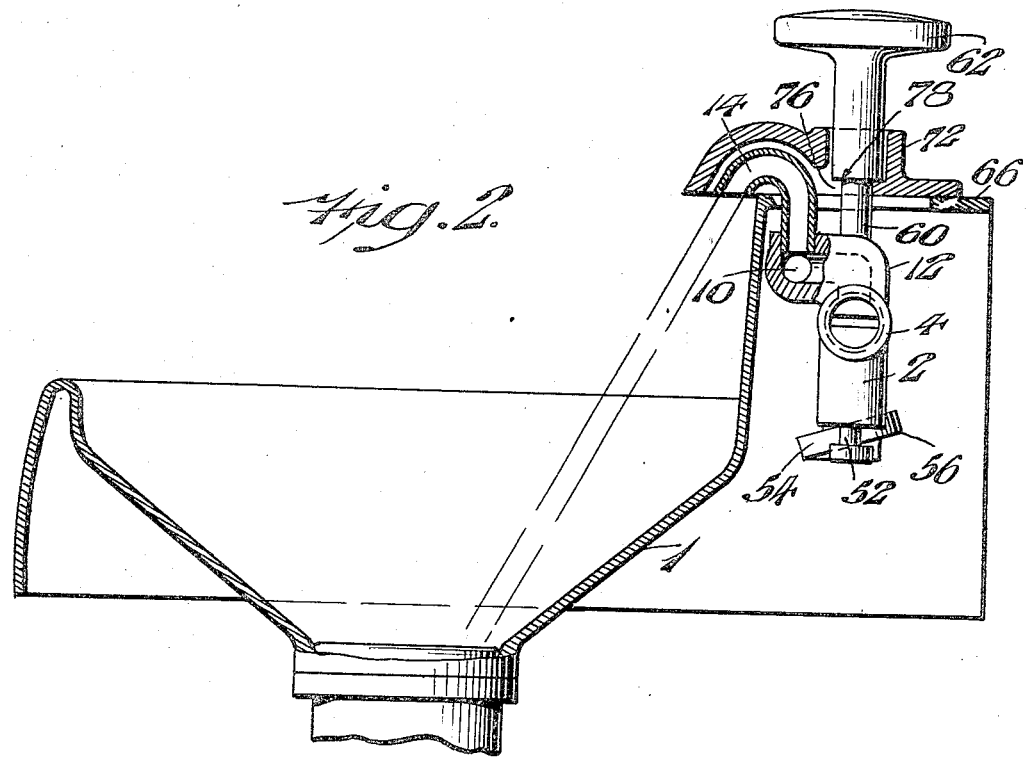
Fig. 2 represents a view on line 2—2 of Fig. 1, certain parts being shown in elevation.

Referring to the drawings in which like reference characters indicate like parts, I designates the bowl of a basin, kitchen sink, or any other fixture to which my novel valve construction may be applied, but I want it clearly understood that it forms no part of my invention since my valve construction has no relation whatsoever to the particular type of equipment to which it is applied.

Referring more particularly to Fig. 5, my novel construction embodies a housing 2 which is provided with the inlets 3 and 4 threaded to receive correspondingly threaded ends of pipe sections (not shown) for delivering hot and cold water, it being assumed, for the purposes of the present description, that the inlet 3 is for cold water and the inlet 4 is for hot water. The inlets 3 and 4 communicate through the ports 6 and 7 with identical chambers 8 and 9 which, in turn, communicate through the ports 10 and 11 with the mixing chamber 12 (see Fig. 3) from which leads the spigot 14. The outer wall of the housing 2 in conjunction with the internal walls 16 form cylinders in which reciprocate the piston-like elements 20 and 22. The pistons 20 and 22 are provided at their upper portions with the valves A and B for controlling the ports 6 and 7 respectively. The valve A (which is identical with the valve B), as shown in detail in Fig. 7, consists of a ring 24 mounted on the stem 26 which is threaded at 28 into the corresponding piston 22. The stem 26 is provided with the head 30 which is adapted, when the valve is in its uppermost or closing position, to abut against the shoulder 34, to limit the upward movement of the piston 22. The solid ring 24 is provided with the upper and lower flanges 36 which are perforated as at 38 and which carry the oppositely facing upper and lower gaskets 40 and 42. It will be noted that the flanges 36 are spaced as at 44 from the adjacent gaskets and that the gaskets 40 and 42 are spaced from the adjacent edges of the ring 24 as at 46. This valve construction serves to hold the valve in its closed position against any water pressure and without the use of any springs, locking means, or excessive friction. Thus, the water entering through the ports 6, or by and past the rings 24, while the valves are in the closing position as shown in Figs. 5 and 7, will enter the spaces 44 and 46 and thus tend to spread the gaskets 40 and 42 outwardly against the wall of their respective cylinders thus effecting a water-tight connection which becomes more tight as the water pressure increases. The pistons 20 and 22 are provided with annular recesses 50 and 52 which are adapted to be engaged by the periphery of a cam element C. The cam element C is formed of a left hand screw thread 54 extending through 180° and the right hand screw thread 56 also extending through an angle of 180°. The left and right hand screw threads 54 and 56 engage the recesses 50 and 52 on the pistons 20 and 22 respectively, or vice versa. The cam element C is carried by the main operating stem 60 which terminates at its upper end in the handle 62 at a point above the top cover plate 66. For the purpose of facilitating manufacture as well as assembly, replacement, and repair, the upper end of the stem 60 is preferably threaded to the handle 62 as at 68, and the housing 2 in its entirety is preferably secured to the cover plate 66 by means of the bolts 70 which pass through the hub 72 and through the cover 66 to engage the upper portions of the housing 2 as at 74. By this construction it is merely necessary to disconnect the pipes threaded into the inlets 3 and 4, the handle 62, and disengage the bolts 70, whereupon the entire housing 2 can be removed and the pistons 20 and 22 can then be pulled out.

Figure 4:
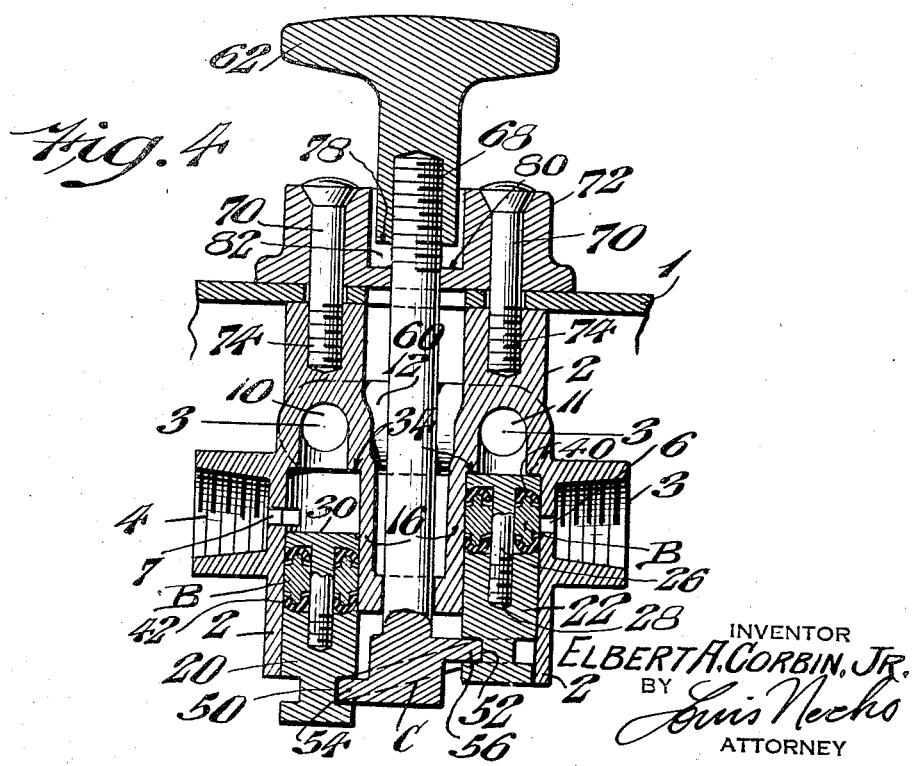
Fig. 4 represents, on an enlarged scale, a vertical sectional view showing my valve construction in a position to deliver water in full volume from one inlet and completely shutting off the flow through the other inlet.

The operation is as follows:

If it is desired completely to stop the flow of both the cold and hot water, the handle 62 is brought to the "off" position which is preferably centrally located as shown in Fig. 1, and the handle 62 is then pulled upwardly until the heads 30 of the stems 26 abut against the shoulders 34 as best seen in Fig. 5. In this position the upper and lower gaskets 40 and 42 are disposed on either side of the ports 6 and 7 and no water from the inlets 3 and 4 can reach the mixing chamber 12 and the nozzle 14. If it is desired to turn the hot water on only, the handle 62 is turned towards the word "Hot". This results in disturbing the balanced position of the valves A and B from the position shown in Fig. 5 to the position shown in Fig. 4, for instance, in which the port 7 is open and the port 6 is completely closed. If it is desired to turn on the cold water only, the operation is reversed, and, when the handle is turned towards the word "Cold", the valve A will be pushed down to clear the port 6 and the valve B will remain in its upper position to shut off the port 7. It will be noted, however, that, when the valve A is abutting against the shoulder 34 and the handle is turned to lower the valve B, the action results in pulling the handle, in its entirety, downwardly. This is due to the fact that the valve A cannot move any further up, and due to the fact that at the same time it is subjected to the upward push of the screw thread cooperating therewith. If the handle is turned completely in one direction so as to lower the valve B, for instance, to its lowermost position as shown in Fig. 4, it will be seen that the handle 62 has been lowered through approximately one-half of its range of movement. Thus, in Fig. 5 the space 76 intervening between the bottom edge 78 of the handle 62 and the top edge of the yoke 80, which forms part of the hub 70, is approximately double the space 82 between the same parts in Fig. 4. Since, by completely turning the handle 62 towards the "Cold" or the "Hot", the corresponding port is completely opened, it follows that by only partly turning the handle towards the "Cold" or the "Hot" the particular port concerned will be only partly opened, and the volume of water is thus regulated. If it is desired fully to open both the cold and the hot water simultaneously, the handle 62 (which is normally in the "off" position) is pushed down until the lower edge 78 of the handle 62 abuts against the top of the yoke 80. This lowers the valves A and B from their uppermost, balanced, closing position shown in Fig. 5 to their lowermost, balanced, open position shown in Fig. 6. If it is desired only partly to open both the hot and cold water valves, the handle 62 is pushed down to the desired extent. If, after the handle 62, while it is in its "off" position, is pushed down until the desired flow of water has been obtained, it is necessary to increase or decrease the "Hot" or "Cold" in order to produce a mixture of the desired temperature, the handle 62 is turned in the direction of the "Cold" or "Hot", as the case may be, partly to restrict one or the other of the ports 6 and 7.

It will thus be seen that by means of the single operating handle 62 I am enabled, by using only two movements, namely, the rotary and reciprocal, completely or partly to open either the hot or cold water, or both, or to produce any desired mixture thereof. It will further be seen that due to the absence of springs, or other locking means, and due to the simple sliding or rotary movement, my novel valve is not only extremely simple to manufacture, install, maintain and operate, but is also extremely compact so that the reciprocal as well as rotary movements involved can be effected within a very limited range.

While I have shown my valve as applied to a water faucet for supplying cold or hot water or both, it is to be understood that the valve is equally applicable to faucets dispensing any kind of a liquid, or gas, such as a mixing of different kinds of oils or other compounds, or the single or mixed delivery of various gases such as oxygen, air, or the like. Also, it is to be noted that my valve, though shown in a vertical position, can be mounted horizontally, up-side-down, or at any desired angle or position.

Having thus described my invention, what I claim as new and desire to secure by Letters Patent is:

A valve construction comprising a casing having a pair of chambers formed therein, a pair of inlets communicating laterally with said chambers, a pair of outlets leading from the upper portions of said chambers to a common discharge, a pair of valve pistons reciprocable in said chambers for controlling said inlets, the lower ends of said valve pistons being provided with annular recesses, a reciprocable handle mounted in said casing intermediate said valve pistons, and a cam at the lower end of said handle constantly engaging said annular recesses, said cam comprising a right hand screw thread for actuating one of said valve pistons and a left hand screw thread for actuating the other of said valve pistons, whereby the relative positions of said valve pistons may be varied or equalized by the rotation of said handle and whereby by raising or lowering said handle both of said valve pistons may be moved simultaneously and independently of their relative positions.

ELBERT A. CORBIN, Jr.